United States Patent
Odendall

(10) Patent No.: US 7,594,431 B2
(45) Date of Patent: Sep. 29, 2009

(54) METHOD FOR DIAGNOSING A STORAGE-CAPABLE CATALYTIC CONVERTER FOR EXHAUST AFTERTREATMENT IN AN INTERNAL COMBUSTION ENGINE

(75) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 190 days.

(21) Appl. No.: 11/976,122

(22) Filed: Oct. 22, 2007

(65) Prior Publication Data
US 2008/0282787 A1    Nov. 20, 2008

(30) Foreign Application Priority Data
Oct. 20, 2006   (DE)   ................ 10 2006 049 642

(51) Int. Cl.
  *G01M 15/10*   (2006.01)
(52) U.S. Cl. .................................. 73/114.75
(58) Field of Classification Search ........... 73/114.69, 73/114.75, 114.76
  See application file for complete search history.

(56) References Cited

U.S. PATENT DOCUMENTS 5,815,828 A * 9/1998 Nankee et al. .............. 701/109
6,983,645 B2 * 1/2006 Webb et al. ............... 73/118.01
2004/0210378 A1 * 10/2004 Ellmer ....................... 701/114

FOREIGN PATENT DOCUMENTS

DE  10 2004 008 172   10/2005
DE  10 2005 035 707    2/2007

* cited by examiner

Primary Examiner—Eric S McCall
(74) Attorney, Agent, or Firm—Novak Druce & Quigg LLP

(57) ABSTRACT

In a method for diagnosing a storage-capable catalytic converter of an internal combustion engine which is supplied with sufficiently hot exhaust gas so that its temperature is above the starting temperature of the exhaust gas, it is proposed that the catalytic converter is briefly supplied with cooler exhaust gas so that a cold wave passing through it forms, that the axial position of the cold wave within the catalytic converter is computed, and that the size of the storage unit is determined from the signal of an exhaust gas probe connected downstream from the catalytic converter relative to the axial position of the cold wave. According to the invention, a differentiated diagnosis method is made available by which not only the axial position or the region of damage of the storage unit can be determined, but by which the reduction of conversion of a certain pollutant A,B caused by the axial position of the damage can be indicated.

8 Claims, 4 Drawing Sheets

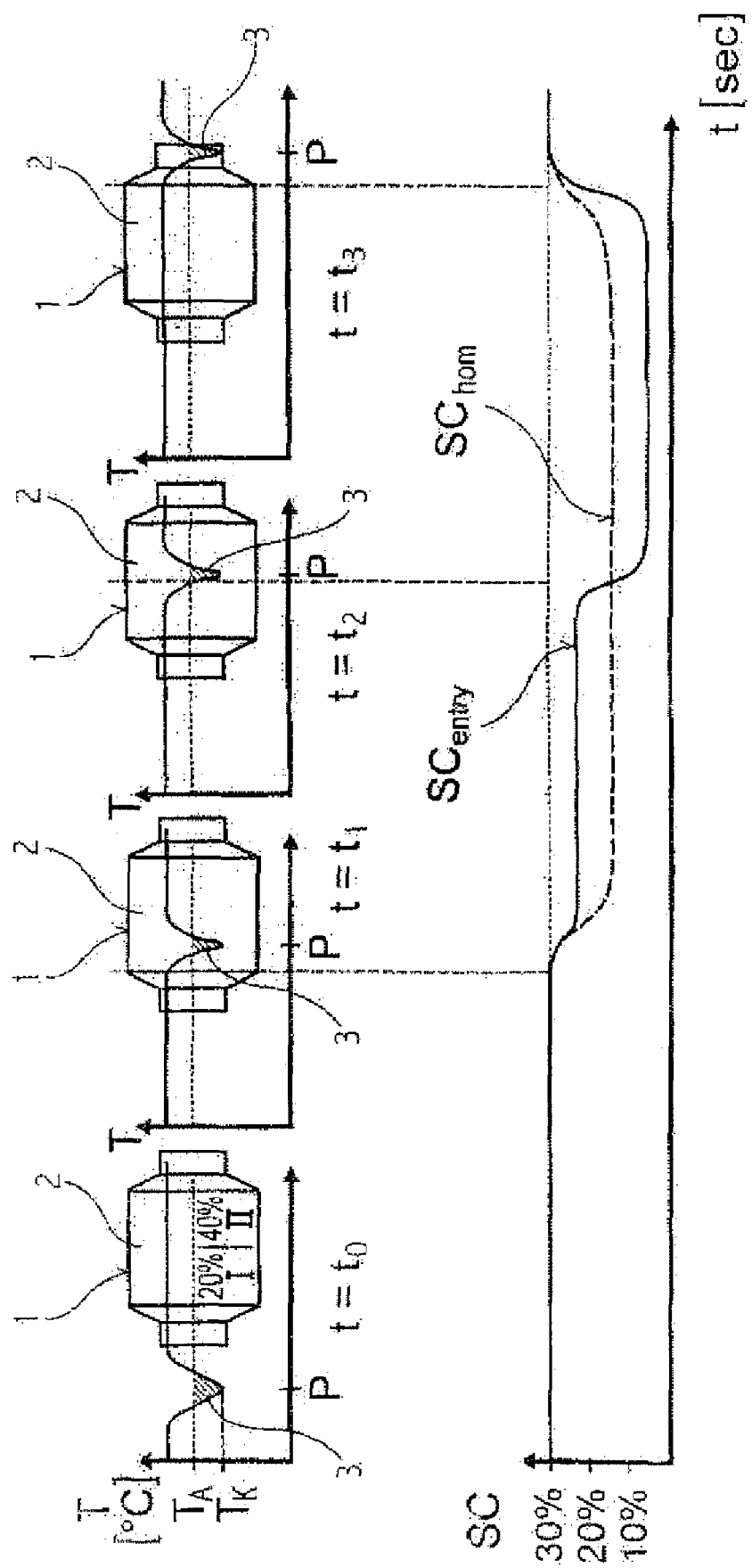

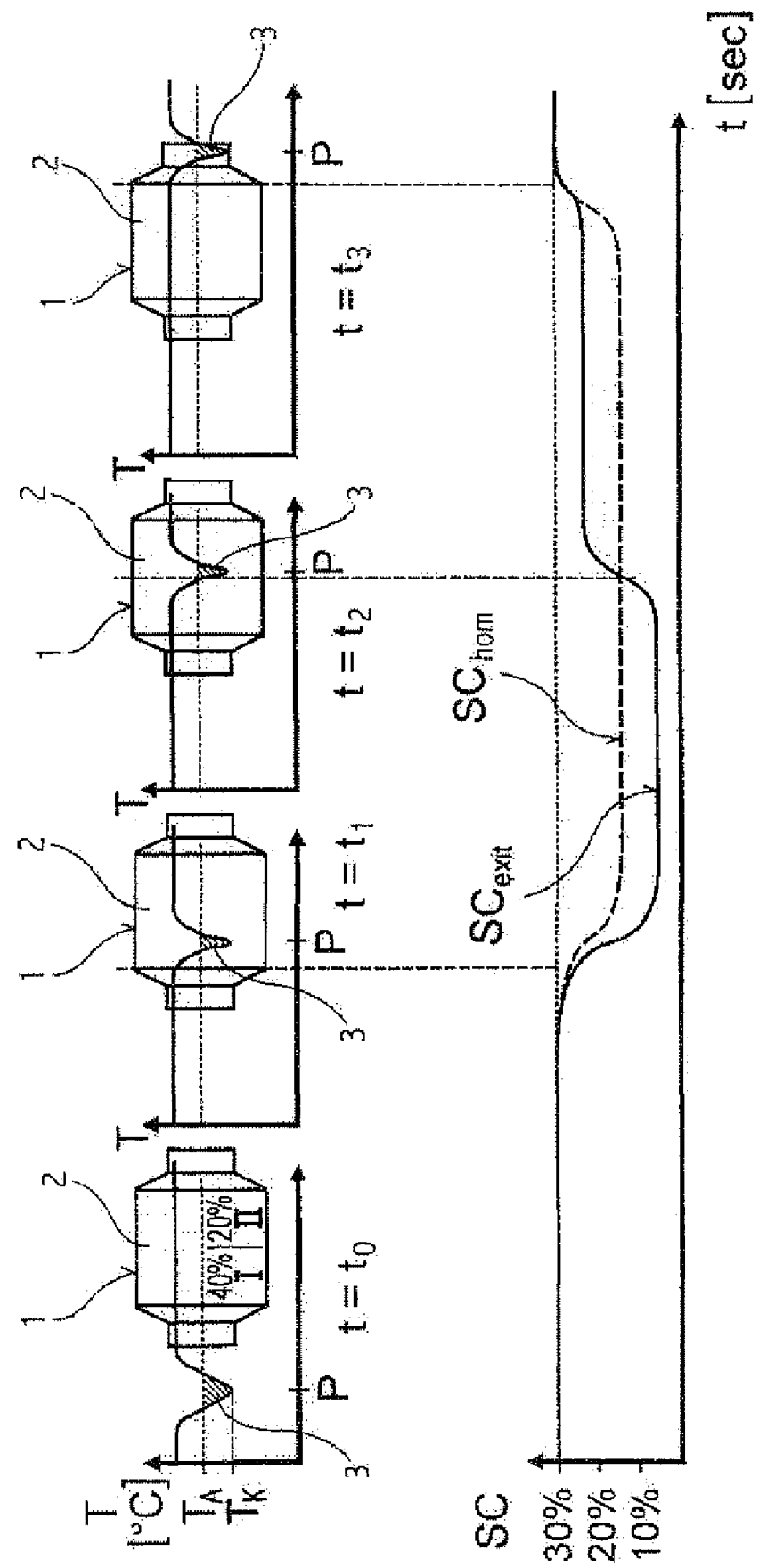

METHOD FOR DIAGNOSING A STORAGE-CAPABLE CATALYTIC CONVERTER FOR EXHAUST AFTERTREATMENT IN AN INTERNAL COMBUSTION ENGINE

CROSS-REFERENCE TO RELATED APPLICATIONS

This application claims priority from German Application No. 102006049642.6 filed Oct. 20, 2006, hereby incorporated by reference in its entirety.

This invention relates to a method for diagnosing a storage-capable catalytic converter of an internal combustion engine which is supplied with sufficiently hot exhaust gas so that its temperature is above the starting temperature.

BACKGROUND OF THE INVENTION

Document DE 198 11 574 A1 describes a method for checking the serviceability of the catalytic converter of an internal combustion engine. In this method the degree of conversion is determined as a function of the temperature of the catalytic converter in heating operation, since with increasing age of the catalytic converter the relationship changes between the degree of conversion and the temperatures, by which the catalytic converter can be checked.

Document DE 43 38 547 A1 discloses monitoring a catalytic converter in a motor vehicle using the temperature distribution, the temperature distribution being detected by a sensor element which is oriented in the longitudinal direction of the catalytic converter. Since the temperature distribution is influenced by the exothermally proceeding pollutant conversion, the conversion capacity can be assessed by way of the temperature distribution.

Document DE 41 00 397 C2 discloses another method for monitoring the degree of conversion of a catalytic converter. This method calls for measuring the temperature values of sites on the catalytic converter with different temperatures during coasting phases of the internal combustion engine and comparing the to one another and using the resulting comparison value to obtain a monitoring signal.

Finally document DE 102 22 223 A1 discloses a method for monitoring and controlling a catalytic converter of an internal combustion engine in which the axial temperature distribution within the catalytic converter is computed, the computed axial temperature distribution at least one site being compared to measured values and constituting a measure of the activity of the catalytic converter from the difference resulting from the comparison, and when a given activity threshold is not reached, an OBD function is activated.

In this context, the object of this invention is to make available a further improved method for diagnosis which allows not only an integrated assessment of the storage capacity, and thus the conversion performance, but a differentiated assessment which in case of damage indicates the axial position and the region of the damage of the storage unit. This is because depending on where the damage is located within the catalytic converter, it acts differently on the conversion performance.

SUMMARY OF THE INVENTION

This object is achieved by the catalytic converter being briefly supplied with cooler exhaust gas so that a cold wave which passes through the catalytic converter forms, the axial position of the cold wave within the catalytic converter is computed and the size of the storage unit is determined from the signal of an exhaust gas probe connected downstream from the catalytic converter relative to the axial position of the cold wave. By the effects of the cold wave on the signal of the exhaust gas probe connected downstream from the catalytic converter being examined, it can be understood how serviceable the region of the storage unit shielded by the cold wave is and how heavily this region is involved in the total pollutant conversion. A major change of the signal of the exhaust gas probe means high serviceability, while a minor change of the signal indicates low serviceability or damage of the storage unit at the position traversed instantaneously by the cold wave and/or on the corresponding region.

Advantageously the cooler exhaust gas is supplied during coasting operation of the internal combustion engine. This is due to the fact that the coasting operation delivers an exactly defined amount of cool exhaust gas or unburned fuel/air mixture which passes through the catalytic converter in a predictable manner as a cold wave.

The supply of cooler gas should be dimensioned such that the temperature of the catalytic converter at the position of the cold wave is just below the starting temperature. This is because if the temperature at the respective position of the cold wave is below the starting temperature, the conversion of the affected region of the storage unit can be reliably shielded.

By preference, the axial position of the cold wave within the catalytic converter is computed as a function of the mass of the exhaust gas and the thermal capacity of the catalytic converter, although generally the current temperature distribution within the catalytic converter could also be measured.

Advantageously the size of the storage unit determined relative to the axial position of the cold wave is compared to at least one given lower boundary value. If the determined size of the storage unit falls below the boundary value, the catalytic converter no longer achieves adequate conversion in this region of the storage unit.

The lower boundary value of the storage unit is especially advantageously dependent on the axial position within the catalytic converter.

If the size of the storage unit in the entry region of the catalytic converter falls below a first lower boundary value, inadequate conversion of the first pollutant is diagnosed.

And if the size of the storage unit in the exit region of the catalytic converter falls below a second lower boundary value, inadequate conversion of a second pollutant is diagnosed.

This is due to the fact that the axial position of the damage influences the conversion of different pollutants differently, so that here the corresponding differentiation can take place. Thus, for example, damage of the entry region can have a less critical effect than comparable damage of the exit region, since the first pollutant affected by the damage of the entry region is less polluting than the second pollutant affected by the damage of the exit region or vice versa.

BRIEF DESCRIPTION OF THE DRAWINGS

This invention will be detailed with reference to the following figures.

FIG. 4 shows a second representation of a cold wave traveling through a catalytic converter with damage in the entry region and its effect on the storage capacity; and FIG. 5 shows a third representation of a cold wave traveling through a catalytic converter with damage in the exit region and its effect on the storage capacity.

DETAILED DESCRIPTION OF EMBODIMENTS OF THE INVENTION

Figure 1:
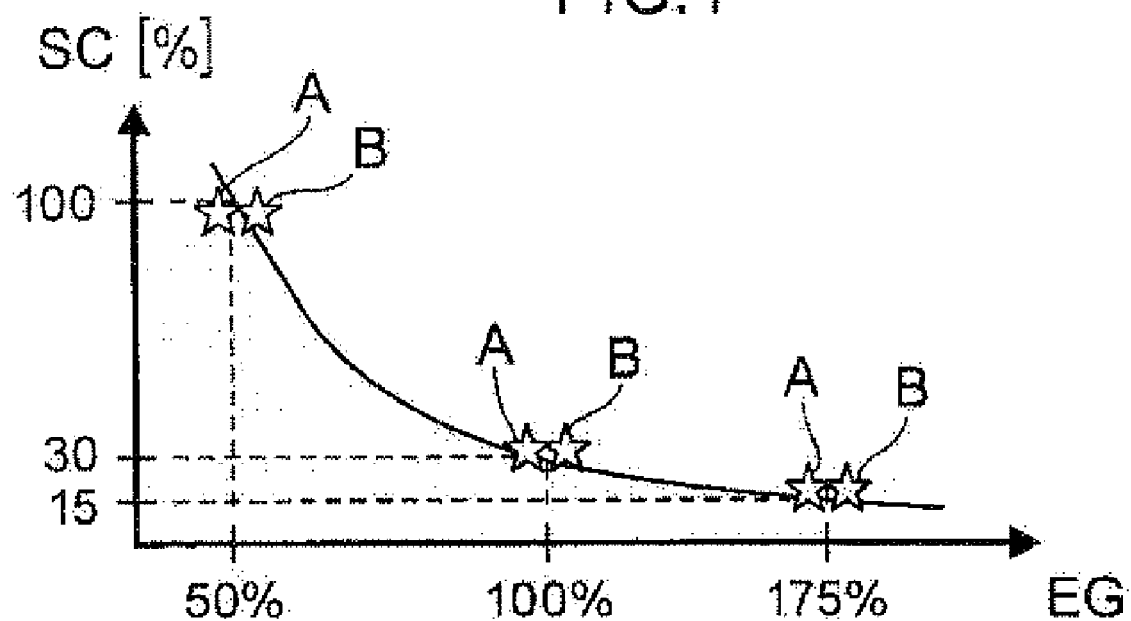
FIG. 1 shows a simplified diagram which shows the relationship between the storage capacity and the emission boundary value for homogeneous ageing or damage of the catalytic converter.

The diagram from FIG. 1 plots the storage capacity SC of a catalytic converter 1 for exhaust emission control in an internal combustion engine with an idealized homogenous storage unit 2. It is clearly shown there that with decreasing storage capacity SC of the catalytic converter 1 the conversion capacity decreases. Thus, for a storage capacity SC of originally 100%, conversion of pollutants A and B to approximately 50% of the emission boundary value EG can be achieved, at a storage capacity SC of 30% conversion to approximately 100% of the emission boundary value EG can be achieved and the emission boundary value EG for a storage capacity of only 15% is clearly too low with 175%. In this context, more or less the same values are achieved for the conversion of the first pollutant A and of the second pollutant B which occurs during storage and during discharge.

These values apply to the storage capacity SC of oxygen (OSC) and to the conversion of hydrocarbon (HC) as the first pollutant A and nitrogen oxides (NOx) as the second pollutant B, which conversion occurs in oxidation and reduction.

Figure 2:
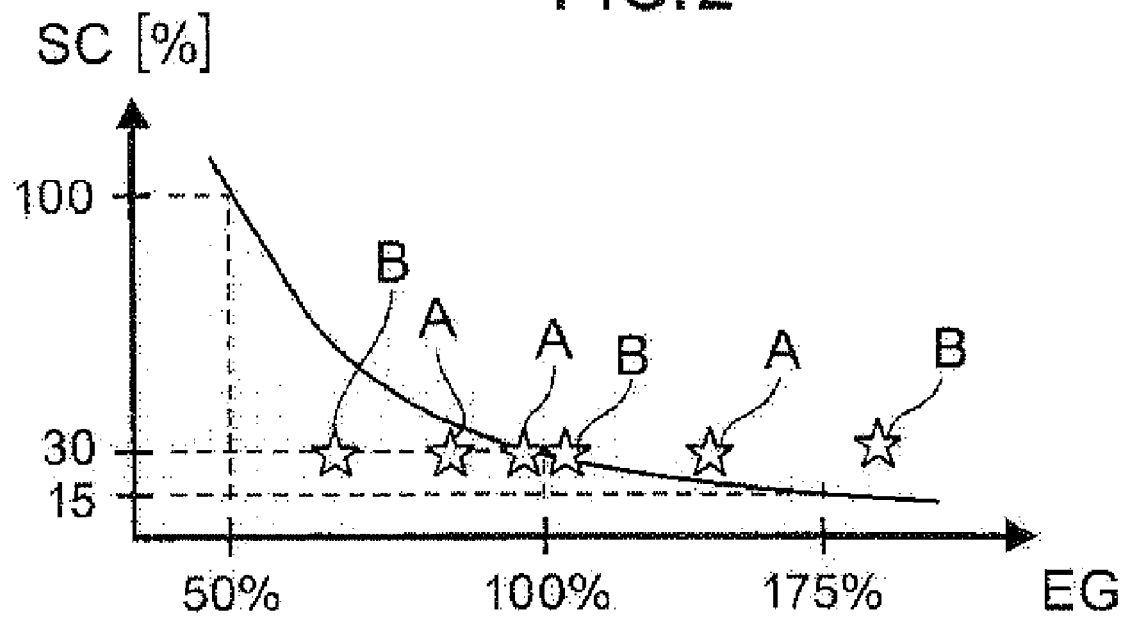
FIG. 2 shows a diagram as shown in FIG. 1 which shows the relationship between the storage capacity and the emission boundary value for nonhomogeneous damage.

If this diagram is examined for a catalytic converter 1 not only with a homogeneous storage unit 2 of 30%, but, as shown in FIG. 2, also with a realistic nonhomogeneous storage capacity of 30%, i.e., in the first example with damage of the storage unit 2 in the entry region at 20% and damage of storage unit 2 in the exit region at 40% and in the second example with damage of the storage unit 2 in the entry region at 40% and damage of the storage unit 2 in the exit region at 20%, it was found that the conversion capacity of the first pollutant A and of the second pollutant B diverge from one another since their conversion is greatly influenced by the nonhomogeneity. Thus damage in the entry region has an especially adverse effect on the conversion of the first pollutant A, while damage in the exit region has an especially adverse effect on the second pollutant B.

In order to determine the axial position or the region of damage of the storage unit 2, it is provided according to the invention that the catalytic converter 1 be traversed with a cold wave 3 which has been initiated in coasting operation of the internal combustion engine and which cools the catalytic converter 1 to below its starting temperature $T_A$ to a cooler temperature $T_K$, by which the region of the storage unit 2 affected by the cold wave 3 no longer converts, that is to say, is more or less shielded, so that damage which may be present acts especially distinctly on the entire storage capacity SC. In this context, the storage capacity SC is determined by an exhaust gas probe which is not shown and which is connected downstream from the catalytic converter 1, such as for example a lambda probe.

Figure 3:
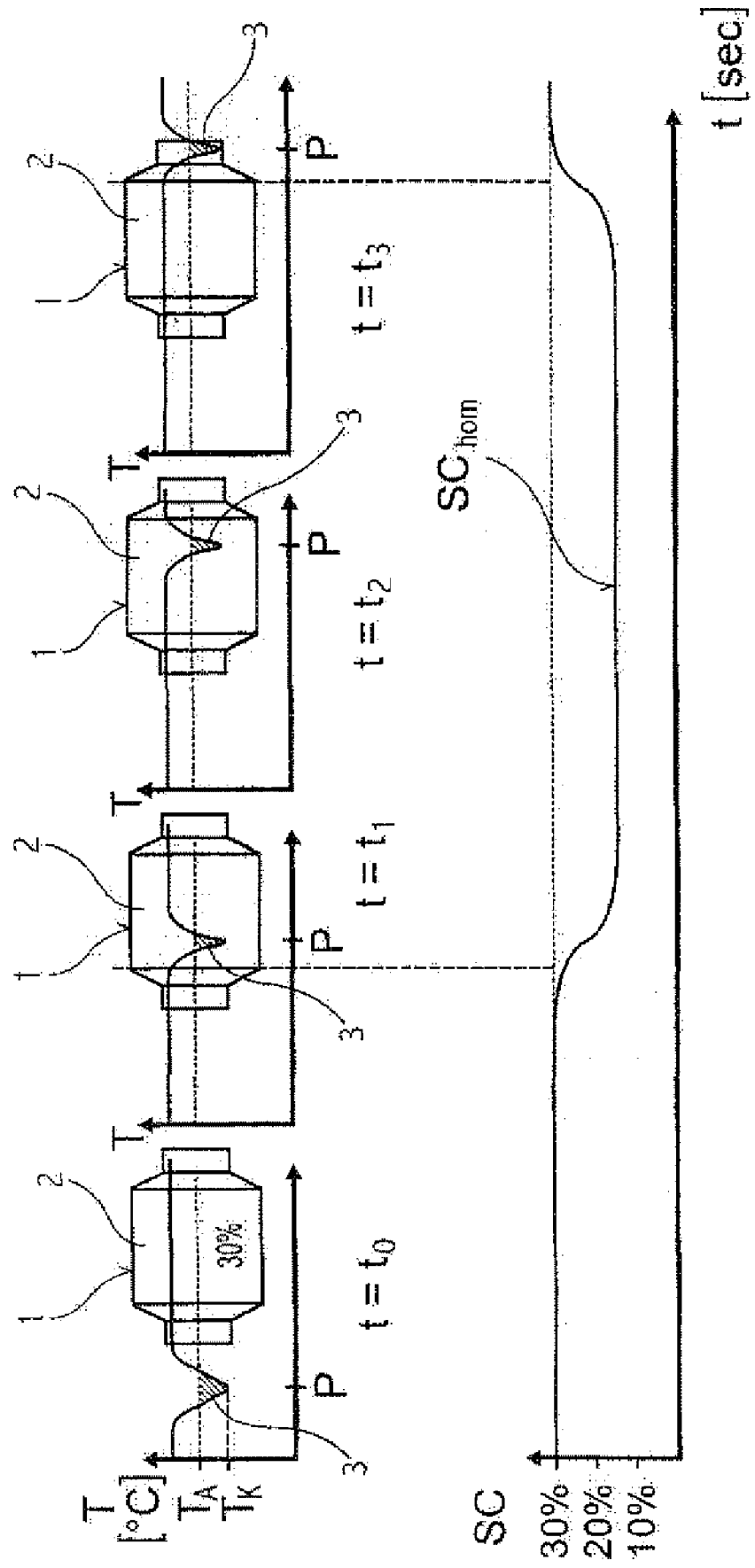
FIG. 3 shows a first schematic of a cold wave traveling axially through a catalytic converter with homogenous damage and its effect on the storage capacity of the catalytic converter plotted over time.

In the case shown in FIG. 3 of homogenous damage of the storage unit 2 of the catalytic converter 1 at 30%, the determined storage capacity $SC_{hom}$ during time $t_1$ in which the cold wave 3 passes through the catalytic converter 1 is reduced to a constant value of approximately 15%, as is illustrated in the bottom graph of the oxygen storage capacity SC over time t.

Conversely, in the case shown in FIG. 4 of damage which prevails in the entry region I and which corresponds to a storage capacity of only 20%, a different behavior would appear. The determined storage capacity $SC_{entry}$ in the time after $t_1$ in which the cold wave 3 travels through the entry region I is only slightly reduced since this region does not perform a large portion of the conversion anyway. And starting at time $t_2$ from which the cold wave 3 travels through the second half or the exit region II of the storage unit 2, the storage capacity $SC_{entry}$ is reduced much more dramatically since this exit-side region II, which is now shielded and which has a storage capacity of 40%, performs the largest portion of the conversion.

And in the case of the damage shown in FIG. 5 which prevails in the exit region II and which corresponds to a storage capacity of only 20%, in turn a different behavior would appear. This is because the storage capacity $SC_{exit}$ in the time after $t_1$ in which the cold wave 3 travels through the entry region I of the catalytic converter 1 is especially dramatically reduced, since the entry-side region I performs the largest portion of conversion here at a storage capacity of 40%. If the cold wave 3 thereupon travels through the exit-side region II, at time $t_2$ a rise of the storage capacity $SC_{exit}$ occurs since the exit-side region II of the storage unit 2 can no longer perform an important portion of the conversion due to its damage.

At time $t_3$ the cold wave 3 in FIG. 3, FIG. 4 and FIG. 5 has traversed the entire catalytic converter 1 so that the storage capacity $SC_{hom}$, $SC_{entry}$ and $SC_{exit}$ rises again to its original value.

The conversion of the first pollutant A and of the second pollutant B coupled in the catalytic converter 1 to storage in the entry region I or to discharge from the exit region II can be determined from the axial position and region of damage of the storage unit 2. And by determining the conversion of different pollutants A, B, improved diagnosis which ensures adherence to different emission boundary values EG for the different pollutants A, B can be done.

| List of Reference Symbols | |
|---|---|
| 1 | Catalytic converter |
| 2 | Storage unit |
| 3 | Cold wave |
| P | Position of 3 |
| I | Entry region |
| II | Exit region |
| SC | Storage capacity |
| $SC_{hom}$ | Storage capacity for a homogeneously damaged storage unit 2 |
| $SC_{entry}$ | Storage capacity for a storage unit 2 damaged on the entry side |
| $SC_{exit}$ | Storage capacity for a storage unit 2 damaged on the exit side |
| $T_A$ | Starting temperature |
| $T_K$ | Cooler temperature |
| t | Time |
| A, B | First pollutant, second pollutant |
| EG | Emission boundary value |

The invention claimed is:

1. A method for diagnosing a storage-capable catalytic converter of an internal combustion engine which is supplied with sufficiently hot exhaust gas so that its temperature is above the starting temperature, comprising:
supplying the catalytic converter briefly with cooler exhaust gas so that a cold wave passing through it forms;
computing the axial position of the cold wave within the catalytic converter; and determining the capacity of the storage unit from the signal of an exhaust gas probe connected downstream from the catalytic converter relative to the axial position of the cold wave.

2. The method according to claim 1, wherein the cooler exhaust gas is supplied during coasting operation of the internal combustion engine.

3. The method according to claim 1 wherein the supply of cooler gas is dimensioned such that the temperature of the catalytic converter at the position of the cold wave is below the starting temperature.

4. The method according to claim 1 wherein the axial position of the cold wave within the catalytic converter is computed depending on the mass of the exhaust gas and the thermal capacity of the catalytic converter.

5. The method according to claim 1 wherein a lower boundary value of the storage unit is dependent on the axial position within the catalytic converter.

6. The method according to claim 1 wherein the size of the storage unit determined relative to the axial position of the cold wave is compared to at least one given lower boundary value.

7. The method according to claim 6 wherein if the size of the storage unit in the entry region of the catalytic converter falls below the boundary value, inadequate conversion of a first pollutant is diagnosed.

8. The method according to claim 6 wherein if the size of the storage unit in the exit region of the catalytic converter falls below a boundary value, inadequate conversion of a second pollutant is diagnosed.

* * * * *